No. 739,193. PATENTED SEPT. 15, 1903.
D. LUBIN.
AGRICULTURAL IMPLEMENT.
APPLICATION FILED FEB. 18, 1903.
NO MODEL.
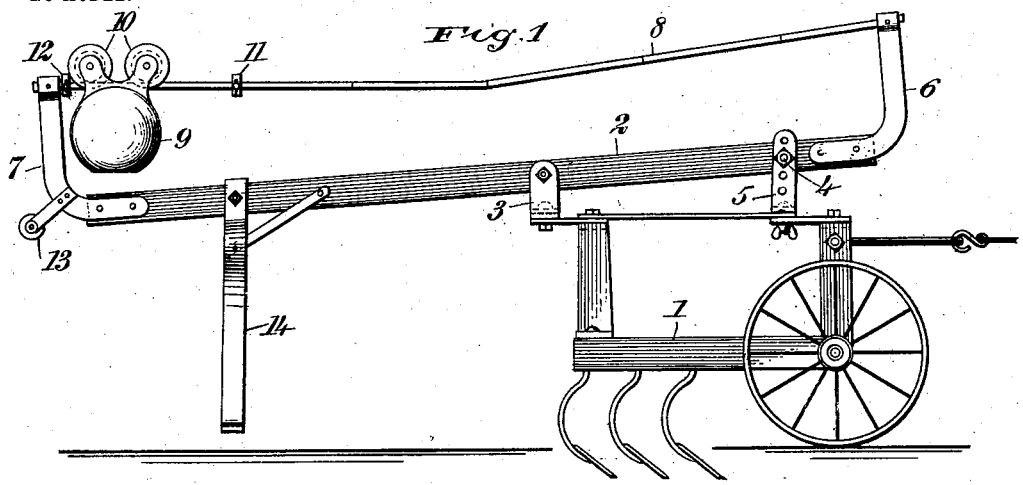
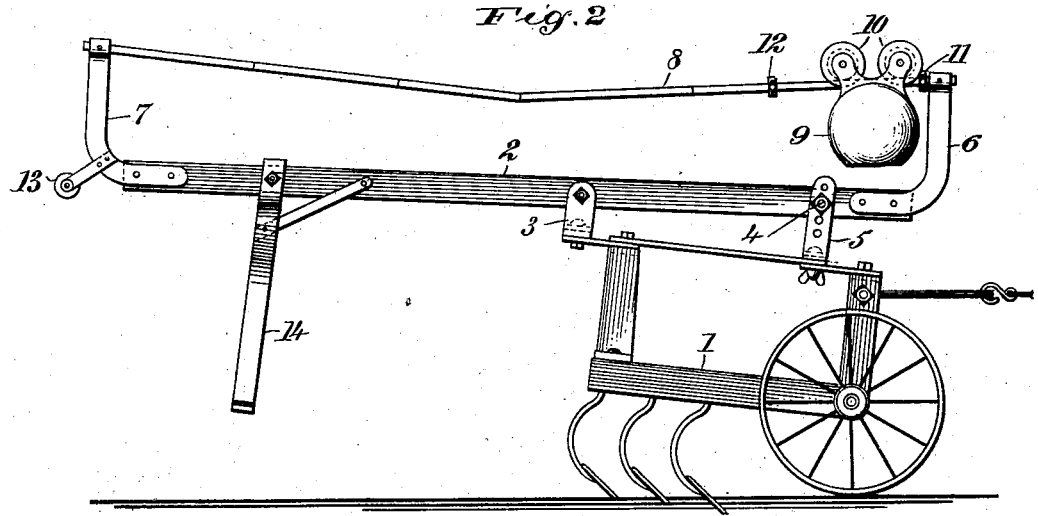
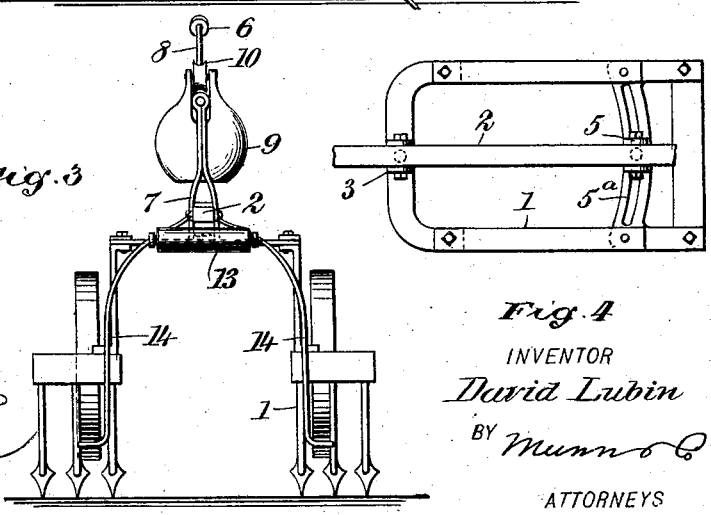
INVENTOR
David Lubin
BY Munn & Co.
ATTORNEYS
WITNESSES No. 739,193. Patented September 15, 1903.

UNITED STATES PATENT OFFICE.

DAVID LUBIN, OF NEW YORK, N. Y.

AGRICULTURAL IMPLEMENT.

SPECIFICATION forming part of Letters Patent No. 739,193, dated September 15, 1903.

Application filed February 18, 1903. Serial No. 143,955. (No model.)

*To all whom it may concern:*

Be it known that I, DAVID LUBIN, a citizen of the United States, and a resident of the city of New York, borough of Manhattan, in the county and State of New York, have invented a new and Improved Agricultural Implement, of which the following is a full, clear, and exact description.

This invention relates to improvements in agricultural implements, an object being to provide in connection with such implement a simple means for regulating the depth of cut or drill of the machine.

I will describe an agricultural implement embodying my invention and then point out the novel features in the appended claims.

Reference is to be had to the accompanying drawings, forming a part of this specification, in which similar characters of reference indicate corresponding parts in all the figures.

Figures 1 and 2 are side elevations of an agricultural implement embodying my invention, showing the regulating-weight in different positions. Fig. 3 is a rear end view thereof, and Fig. 4 is a plan view of a portion of the device.

Referring to the drawings, 1 designates an agricultural implement, here shown in the form of a cultivator or drill; but it is to be understood that other forms of implements may be employed in connection with my improvement.

Arranged on the frame of the implement is a bar 2, which is fulcrumed between lugs 3 and may be held as adjusted as to its angle by means of a bolt 4, passing through any one of the holes arranged in an upright 5 in the machine-frame. On the front and rear ends of the bar 2 are upwardly-extended arms 6 7, to which is connected a curved rail 8, on which is movable a regulating-weight 9. This weight 9 has rollers 10, which are engaged with the rail, and the weight may be secured in its adjusted position by means of collars 11 12, secured on the rail by thumb-screws. It will be noted that the weight has free movement on the rail and its range of movement will be the space between collars as adjusted. The rear arm 7 is provided with a handle 13, by means of which the rail may be raised or depressed to cause the weight to roll to any desired position. At its opposite sides the bar 2 is provided with legs 14, which may rest on the ground when the implement is not in use.

In operation by placing the weight 9 at the extreme rear end of the rail 8 and rearward of the teeth the teeth of the cultivator will be caused to sink deeply into the ground, and by placing the weight at the forward end of said rail and foward of the teeth, as indicated in Fig. 2, the teeth will be drawn upward, so as to project but slightly into the ground, and obviously the depth of cut may be regulated by placing the weight at any desired point between the ends of the rail, and as a guide for placing the weight for varying degrees of work the rail may be provided with graduating marks, as indicated in Fig. 1.

It may be here stated that it will be found necessary at certain times to put a greater weight on one of the side wheels or side teeth than on the other, so that the teeth of the implement will operate practically all at the same depth. In other words, after passing along or over a field the weight may be arranged directly over the center of the implement, and in lapping on the return movement one of the wheels or teeth on that side obviously will engage upon the ground already cultivated and the other wheel or teeth will be on the hard or uncultivated ground. Therefore it is necessary to shift the weight laterally or toward the wheel bearing on the solid ground, thus preventing the tilting downward of the lapping side of the machine. For this purpose the lugs 3 are swiveled on the implement-frame, and the standard 5 is adjustable transversely thereof on said frame.

As here shown, a slotted plate 5ª is secured to the upper side of the implement-frame and a bolt or bolts extend from the standard 5 through said slot and may be locked by suitable thumb-nuts.

Having thus described my invention, I claim as new and desire to secure by Letters Patent—

1. The combination with an agricultural implement having ground-entering devices, of a rail extended forward and rearward of said device, and a weight mounted to travel automatically on said rail.

2. The combination with an agricultural implement, of a beam arranged thereon, arms extended upward from the ends of said beam, a rail attached to the arms, rollers engaging with the rail, a weight suspended from said rollers, and stop-collars adjustable on the rail.

3. The combination with an agricultural implement, of a beam mounted to swing on a horizontal plane thereon, means for securing the beam as adjusted, and a weight adjustable lengthwise of the beam.

4. The combination with an agricultural implement, of a rail extended lengthwise of and above the same, a weight, and a roller on said weight engaging with said rail whereby said weight may automatically change its position lengthwise of the rail, as and for the purpose specified.

5. The combination with an agricultural implement, of a rail extending lengthwise of the implement, the said rail being inclined upward in both directions from a point between its ends, and a weight automatically movable along said rail, substantially as specified.

In testimony whereof I have signed my name to this specification in the presence of two subscribing witnesses.

DAVID LUBIN.

Witnesses:
JNO. M. RITTER,
C. R. FERGUSON.